(12) United States Patent
Vankipuram et al.

(10) Patent No.: US 11,340,709 B2
(45) Date of Patent: May 24, 2022

(54) RELATIVE GESTURES

(71) Applicant: HEWLETT-PACKARD DEVELOPMENT COMPANY, L.P., Spring, TX (US)

(72) Inventors: Mithra Vankipuram, Palo Alto, CA (US); Craig Peter Sayers, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/052,145

(22) PCT Filed: Oct. 18, 2018

(86) PCT No.: PCT/US2018/056452
§ 371 (c)(1),
(2) Date: Oct. 30, 2020

(87) PCT Pub. No.: WO2020/081080
PCT Pub. Date: Apr. 23, 2020

(65) Prior Publication Data
US 2021/0240278 A1 Aug. 5, 2021

(51) Int. Cl.
*G06F 3/01* (2006.01)
*G06F 3/0346* (2013.01)
*G06F 3/04883* (2022.01)
*G06K 7/14* (2006.01)

(52) U.S. Cl.
CPC .............. *G06F 3/017* (2013.01); *G06F 3/016* (2013.01); *G06F 3/0346* (2013.01); *G06F 3/04883* (2013.01); *G06K 7/1413* (2013.01); *G06K 7/1417* (2013.01)

(58) Field of Classification Search
CPC ........ G06F 3/017; G06F 3/0346; G06F 3/016; G06F 3/011; G06T 19/006
See application file for complete search history.

(56) References Cited

U.S. PATENT DOCUMENTS

| | | | |
|---|---|---|---|
| 8,289,410 B2 | 10/2012 | Yamaguchi et al. | |
| 9,635,254 B2 | 4/2017 | Guo et al. | |
| 10,013,670 B2 | 7/2018 | Coussemaeker | |
| 10,026,226 B1* | 7/2018 | Lotto | H04W 4/02 |
| 10,896,545 B1* | 1/2021 | Kin | G06F 3/0304 |
| 2013/0246975 A1 | 9/2013 | Oddiraju et al. | |
| 2014/0149754 A1 | 5/2014 | Silva | |
| 2015/0146925 A1* | 5/2015 | Son | G06F 3/017 |
| | | | 382/103 |

(Continued)

FOREIGN PATENT DOCUMENTS

| | | |
|---|---|---|
| JP | 2015222865 | 12/2015 |
| JP | 2018029239 | 2/2018 |
| WO | WO-2013149267 | 10/2013 |

*Primary Examiner* — Mong-Shune Chung
(74) *Attorney, Agent, or Firm* — Fabian VanCott

(57) ABSTRACT

In an example method, a target object is detected via a camera in a mobile device based on an embedded identifier on the target object. Sensor data of the mobile device is tracked to estimate a relative location or a relative orientation of the mobile device in relation to the target object. A relative gesture is detected via the mobile device based on the relative location or the relative orientation of the mobile device. One or more actions are performed in response to detecting the relative gesture.

18 Claims, 7 Drawing Sheets

(56) References Cited

U.S. PATENT DOCUMENTS

| | | | |
|---|---|---|---|
| 2016/0217623 A1* | 7/2016 | Singh | G09G 3/003 |
| 2019/0107990 A1* | 4/2019 | Spivack | A63F 13/80 |
| 2019/0132700 A1* | 5/2019 | Yokoyama | G06Q 50/01 |

* cited by examiner

RELATIVE GESTURES

BACKGROUND

Mobile devices may include touch screens to receive input from users. For example, the mobile devices may receive gestures such as pinch gestures, expand gestures, or other gestures that are detected via the touch screen of the mobile devices.

BRIEF DESCRIPTION OF THE DRAWINGS

Various features of the techniques of the present application will become apparent from the following description of examples, given by way of example only, which is made with reference to the accompanying drawings, of which.

DETAILED DESCRIPTION

Figure 1:
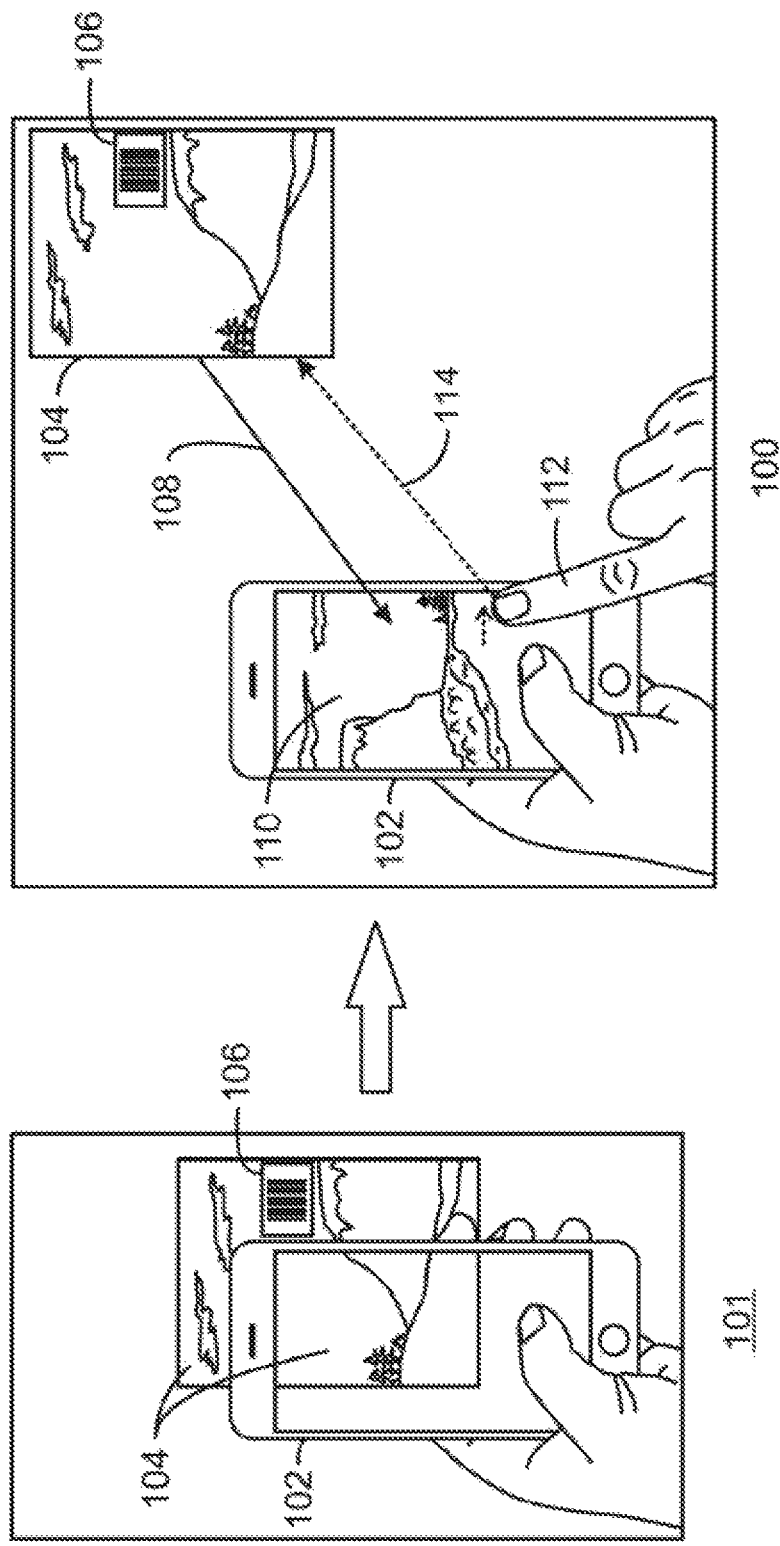
FIG. 1 is a diagram of an example swipe gesture, according to examples described herein.

Mobile devices may respond to various gestures, such as pinch gestures or expand gestures to perform a variety of functions. For example, pinch gestures are sometimes used to zoom out of a picture and expand gestures are used to zoom into pictures. Mobile devices may also include cameras capable of capturing pictures or video. The captured pictures or videos may be saved into a directory and organized at a later time. However, users may wish to associate additional content with photos or videos. For example, users may want to associate additional photos on the mobile device or elsewhere with a target object such as a photo or any other object. Such a process of association, even if possible, may nevertheless be difficult and time consuming. Moreover, retrieving or playing back the associated content may also be difficult or time consuming.

Described herein are techniques for detecting relative gestures and performing actions in response to detecting the relative gestures. As used herein, a relative gesture refers to an event resulting from a user action that is detected along with a relative location or relative orientation of a mobile device to a target object. In some examples, a relative gesture may also include characteristics of the relative gesture. For example, the characteristics can include speed or acceleration as well as orientation of a device or pressure of a touch screen press. For example, a target object may be a photo or a three dimensional object including an embedded identifier. As one example, the embedded identifier is an addressable code. In some examples, the embedded identifier is a barcode, such as a Quick Response (QR) code or Universal Product Code (UPC), or a pattern of embedded dots encoding data. In some examples, the target object itself, or different characteristics thereof, can be an embedded identifier. For example, if a photo is unique such that there are no two photos, then the particular arrangement of dots on the photo may serve as an embedded identifier. In some examples, a hash is calculated on the photo and compared to other hashes in a list of embedded identifier hashes. In some examples, a user can write something on a photo, such as a message or drawing that makes the photo different. In this case, the message or drawing of the user can be used as an embedded identifier. The actions can include associating, disassociating, downloading, uploading, or transferring files. As one example, the files include media, such as photos, videos, audio, or any other of media. In addition, manipulation of media may include associating or disassociating media with the target object based on the detected relative gesture. Furthermore, the techniques described herein include automated playback of associated media based on a detected relative gesture.

Thus, the techniques described herein enable media to be efficiently associated or disassociated with multiple target objects including embedded identifiers, such as photos or three dimensional objects. Thus, the techniques enable interaction with any number of target objects at the same time once the target objects are detected. The techniques also enable associated media to be retrieved or played back efficiently. For example, the media may be retrieved and played back from a cloud service or other networked data source.

FIG. 1 is a block diagram of an example swipe gesture 100, according to examples described herein. The swipe gesture is one example of a relative gesture that can be used by the method 500 of FIG. 5 or implemented in the computing device 602 of FIG. 6 or the computer readable storage medium 700 of FIG. 7.

FIG. 1 includes a mobile device 102 and a target object 104. The target object is a photograph. The photograph includes an embedded identifier 106. In the example of FIG. 1, the embedded identifier 106 is a barcode. In some examples, the embedded identifier 106 is a group of printed dots embedded into the photo. For example, the dots may be embedded in a portion of the photo or over the entire photo. As another example, the embedded identifier is a message or drawing written onto the target object. The message or drawing can be converted into a code and stored in an identifier database. In some examples, the target object may be a three dimensional object. For example, the three dimensional object may be a three dimensional printed object. In some examples, the embedded identifier 106 may be integrated into the three dimensional object.

Prior to the example swipe gesture 100 being detected, the target object 104 is detected via the mobile device 102. For example, the target object 104 can be detected using the embedded identifier 106. The mobile device 102 then tracks the target object 104 in response to detecting the target object 104. For example, the mobile device 102 may use gyroscope data or accelerometer data to track motion relative to the target object 104. As one example, if the mobile device is raised vertically, and the target object is on the floor below the mobile device, then the relative motion is a translation away from the target object and can be detected as a pull gesture, while if the device were raised vertically in the same way, but target object was on the ceiling above the mobile device, then the relative motion is a translation toward the target object and can be detected as a push gesture. In some example, an initial position of the mobile device 102 relative to the target object 104 can be determined based on a size and shape of the embedded identifier 106. The relative position of the mobile device 102 to the target object 104 may be represented in the form of a relative position vector 108 that is updated based on gyroscope data or accelerometer data.

The swipe gesture 100 can then be detected by the mobile device 102. A shown in FIG. 1, the swipe gesture 100 includes a movement of the fingers 112 across a touch screen surface of the mobile device 102 in a direction of the target object 104. In some examples, the mobile device 102 may include a gesture detector (not shown) to detect the swipe gesture 100 in response to detecting a swipe across the touchscreen in the direction of the target object 104. In some examples, the mobile device 102 compares the relative position vector 108 with a gesture vector 114 generated for the swipe gesture 100. If the relative position vector 108 matches the direction of the gesture vector 114, then the swipe gesture 100 may be detected by the mobile device 102. If the relative position vector 108 does not match the gesture vector 114, then no action may be taken.

In some examples, one or more additional characteristics of the movement of the fingers 112 across the touch screen of the mobile device 102 can also be used to detect different swipe gestures 100. For example, the hardness of pressure against the touch screen during a detected swipe gesture 100 can be used to detect soft swipe gestures 100 or hard swipe gestures 100 using a pressure threshold. The mobile device 102 can detect a soft swipe gesture 100 in response to detecting that a pressure threshold is not exceeded during a swipe gesture 100. Similarly, the mobile device 102 can detect hard swipe gesture 100 in response to detecting that the pressure threshold is exceeded during a swipe gesture 100. In some examples, other characteristics, such as speed and distance of the fingers 112 can also be used to detect, for example, slow swipe gestures 100 and fast swipe gestures 100, or short swipe gestures 100 and long swipe gestures 100.

In some examples, any suitable action may be performed in response to detecting the swipe gesture 100. In some examples, one or more media 110 may be associated with the target object 104. For example, the media 110 may be associated with or disassociated from the target object 104 in response to detecting the swipe gesture. As one example, media 110 including an image may be associated with the target object 104 image. Thus, the image may be later retrieved via the mobile device 102 by looking up the target object 104, or via techniques described herein.

The block diagram of FIG. 1 is not intended to indicate that the example swipe gesture 100 is to include all of the components shown in FIG. 1. Further, the swipe gesture 100 may include any number of additional components not shown in FIG. 1, depending on the details of the specific implementation. For example, the mobile device 102 may concurrently track additional target objects 104 and detect swipe gestures 100 directed at any of the additional target objects 104. Thus, a user may be able to efficiently associate or disassociate media with any of a number of target objects 104 using the swipe gesture 100 by performing swipe gestures 100 in different directions.

Figure 2:
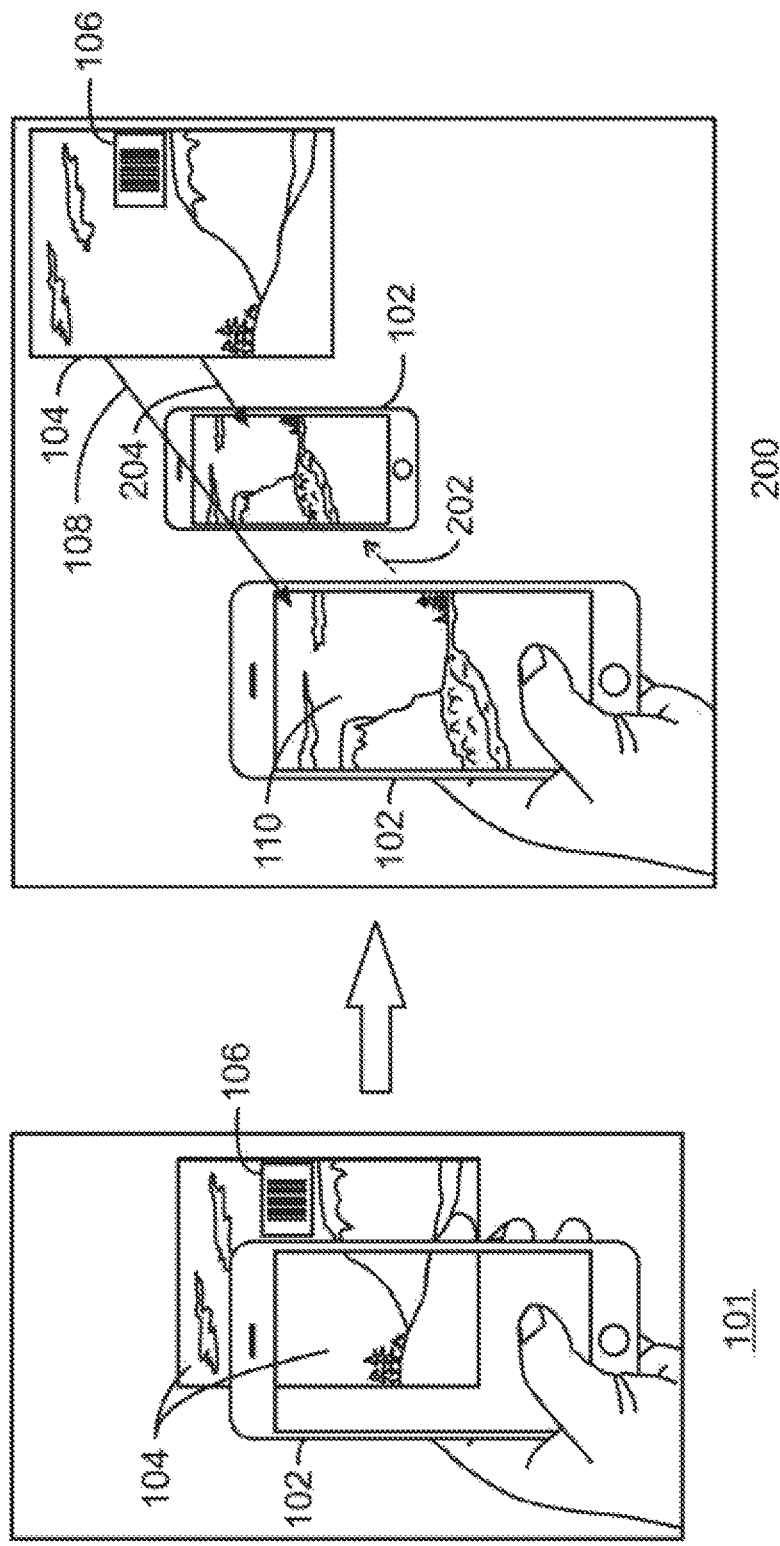
FIG. 2 is a diagram illustrating an example shake gesture, according to examples described herein.

FIG. 2 is a block diagram of an example shake gesture 200, according to examples described herein. The shake gesture 200 is another example of a relative gesture that can be used by the method 500 of FIG. 5 or implemented in the computing device 602 of FIG. 6 or the computer readable storage medium 700 of FIG. 7.

The shake gesture 200 includes similarly labeled elements of FIG. 1 above. For example, a target object 104 with an embedded identifier 106 may be detected 101 by a mobile device 102. Likewise, a relative position vector 108 is calculated for the target object 104 and a media 110 is displayed on the mobile device.

In the example shake gesture 200, a shaking motion is applied to the mobile device 102 to displace the mobile device 102 closer to the target object 104. An acceleration vector 202 may be generated and compared to the relative position vector 108 to detect an acceleration of the mobile device 102 is in the direction of the target object 104. In some examples, acceleration data is detected by the mobile device 102 in the direction of the updated relative position vector 204. A shaking gesture 200 may thus be detected in response to detecting an acceleration of the mobile device 102 exceeds a threshold acceleration in a given direction of a target object. In some examples, the acceleration data or gyroscope data is first used to determine a raw direction of the device motion relative to the position and orientation of the device at the start of the shaking gesture. The raw direction is then transformed to a relative direction based on the measured relative motion of the device to the target object. For example, if the device is shaken vertically and the target object is a photo placed on the floor under the device, then the shaking relative direction is toward and away from the photo. If the same vertical shaking motion is performed, but the photo is stuck to a wall in front of the device, then the shaking relative direction is parallel to the target object. The relative direction is then used to differentiate between different shake gestures 200. In some examples, an intensity detected via an accelerometer or gyroscope during a shake gesture 200 can be used to detect light shake gestures 200 or hard shake gestures 200 in response to detecting a value of acceleration exceeds a threshold intensity.

In some examples, any suitable action may be performed in response to detecting the shake gesture 200. In some examples, one or more media 110 are associated with the target object 104 or manipulated in response to the shake gesture 200. The media 110 may be associated with or disassociated from the target object 104 in response to detecting the shake gesture 200. The media 110 may then be looked up via the mobile device 102 based on the target object 104.

The block diagram of FIG. 2 is not intended to indicate that the example shake gesture 200 is to include all of the components shown in FIG. 2. Further, the shake gesture 200 may include any number of additional components not shown in FIG. 2, depending on the details of the specific implementation. For example, the mobile device 102 may concurrently track additional target objects 104 and detect shake gestures 200 directed at any of the additional target objects 104. Thus, a user may also be able to efficiently associated or disassociate media with any of a number of target objects using the shake gesture 200.

Figure 3:
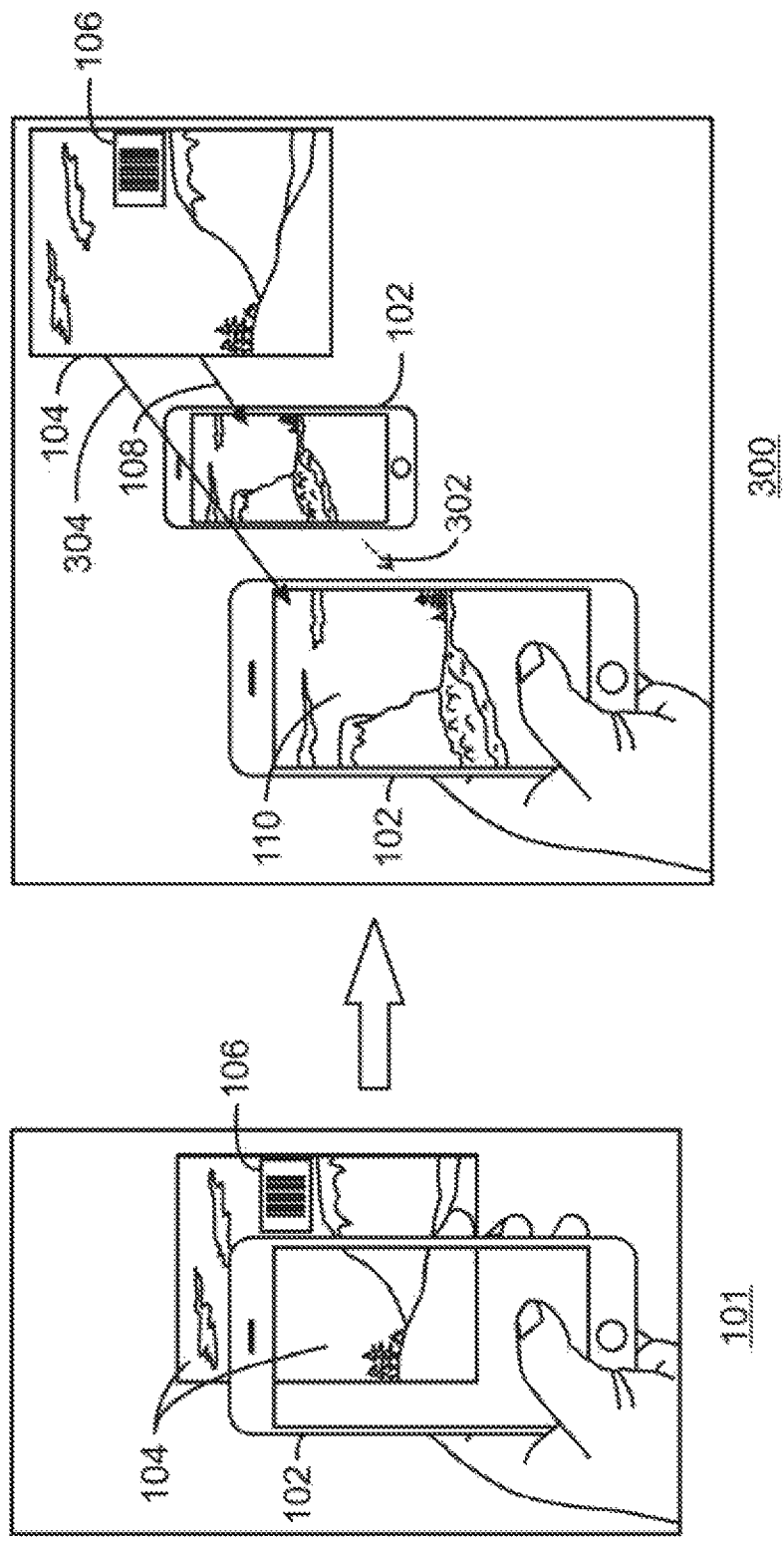
FIG. 3 is a diagram illustrating an example pull gesture, according to examples described herein.

FIG. 3 is a block diagram of an example pull gesture 300, according to examples described herein. The pull gesture 300 is another example of a relative gesture that can be used by the method 500 of FIG. 5 or implemented in the computing device 602 of FIG. 6 or the computer readable storage medium 700 of FIG. 7.

The pull gesture 300 includes similarly labeled elements of FIGS. 1 and 2 above. For example, a target object 104 with an embedded identifier 106 may be detected 101 by a mobile device 102. Likewise, a relative position vector 108 is calculated for the target object 104 and a media 110 is selected and displayed on the mobile device.

In the example pull gesture 300, a pulling motion 302 is applied to the mobile device 102 to displace the mobile device 102 away from the target object 104. In some examples, the mobile device 102 detects the displacement based on a comparison of an initial relative position vector 108 to a second relative position vector 304 calculated after the pulling motion 302 is applied to the mobile device 102. For example, the mobile device 102 may detect a pull gesture 300 in response to detecting a displacement away from the target object 104 in a direction that is parallel to the initial relative position vector 108. In some examples, the mobile device 102 may detect the pull gesture in response to also detecting the displacement starting within a threshold distance of the target object 104.

In some examples, an intensity of the pull gesture 300 is also detected. The intensity of the pull gesture 300 can be based on speed or acceleration. One or more thresholds can be used to define lighter and heavier intensities based on speed or acceleration. For example, a lighter pull gesture 300 may be detected in response to detecting that a speed or acceleration of the pull gesture 300 does not exceed a threshold speed or a threshold acceleration. As another example, a heavier pull gesture 300 can be detected in response to detecting that the speed or acceleration of the pull gesture 300 exceeds the threshold speed or threshold acceleration.

The mobile device 102 can perform one or more actions in response to detecting the pull gesture 300. In some examples, in response to detecting the pull gesture 300, the mobile device 102 saves one or more media associated with the target object. For example, the media may be an album of music tracks or a picture album. The target object may be a picture of an album cover or a picture of an object associated with the picture album. The mobile device 102 can thus transfer content including the media from the web or a cloud server to a storage on the mobile device 102. In some examples, the mobile device 102 plays back one or more media in response to detecting the pull gesture 300. For example, the mobile device 102 can automatically play back one or more audio tracks associated with a target object of an album cover. In some examples, a user can browse through an album of pictures associated with the target object 104 after executing the pull gesture. In some examples, the mobile device 102 performs an action based on the detected intensity of the pull gesture 300. For example, the mobile device 102 can play back a sample audio in response to detecting a lighter intensity pull gesture 300 or retrieve an album of audio in response to detecting a heavier intensity pull gesture 300.

In some examples, different pull gestures 300 are detected based on gyroscope data. As one example, the gyroscope provides axial data that differentiates between action intents. For example, a swipe pull gesture 300 may be detected in response to detecting a pull gesture 300 with a surface of the mobile device 102 moving parallel to a plane with the target object.

The block diagram of FIG. 3 is not intended to indicate that the example pull gesture 300 is to include all of the components shown in FIG. 3. Further, the pull gesture 300 may include any number of additional components not shown in FIG. 3, depending on the details of the specific implementation. For example, the pull gesture 300 may include additional motions, relative position vectors, or threshold distances, target objects, and may cause the mobile device 102 to perform other types of actions. As one example, detecting a pull gesture 300 while within a threshold distance of the target object 104 may result in a "replace all" action rather than an "add to" action. In a "replace all" action, all media associated with the target object 104 may be replaced rather than having new media added to a set of other files associated with the target object 104, as may occur in an "add to" action. As another example, an amount of pulling in the pull gesture 300 may be detected in order to perform different actions. For example, an amount of pulling greater than a predetermined threshold amount of pulling may cause the mobile device to retrieve a predetermined amount of media such as a year or more of media associated with the target object. As another example, in response to detecting an amount of pulling less than a predetermined threshold, the mobile device can automatically retrieve less media associated with the target object, such as media captured within a period of a month or a week.

Figure 4:
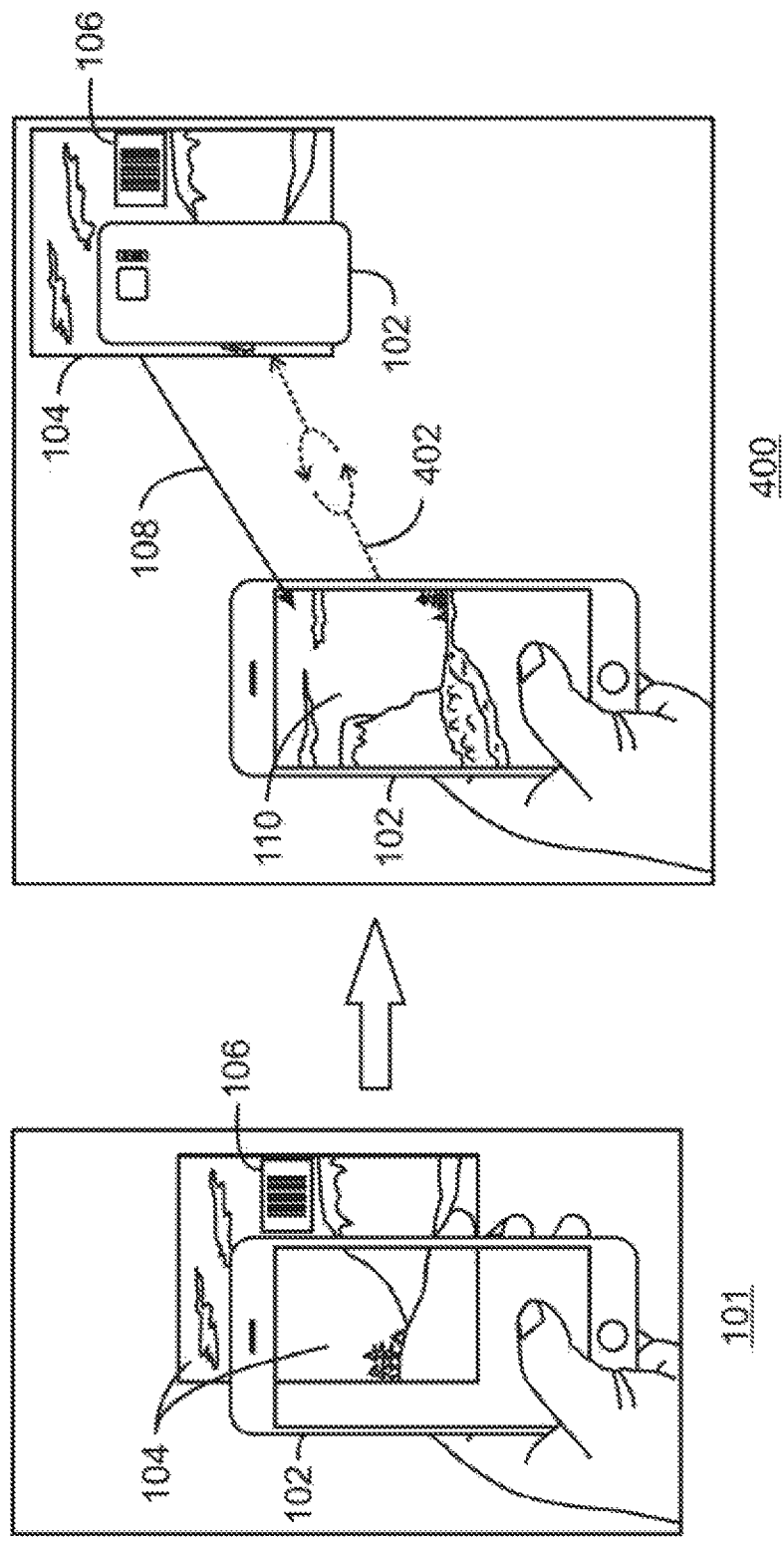
FIG. 4 is a diagram illustrating an example flip gesture, according to examples described herein.

FIG. 4 is a block diagram of an example flip gesture 400, according to examples described herein. The flip gesture 400 is another example of a relative gesture that can be used by the method 500 of FIG. 5 or implemented in the computing device 602 of FIG. 6 or the computer readable storage medium 700 of FIG. 7.

The flip gesture 400 includes similarly labeled elements of FIGS. 1 and 2 above. For example, a target object 104 with an embedded identifier 106 may be detected 101 by a mobile device 102. Likewise, a relative position vector 108 is calculated for the target object 104 and a media 110 is selected and displayed on the mobile device.

In the example flip gesture 400, a flipping motion 402 of the mobile device 102 onto the target object 104 is detected. For example, the flip may be with respect to a horizontal or vertical axis of the mobile device 102. The mobile device 102 may detect the flip gesture 400 based on gyroscope data, distance from the target object, or any combination thereof. For example, the distance may be based on proximity information taken from an updated relative position vector. In some examples, the proximity information is a specific distance, such as three feet versus one foot. In some examples, the proximity information is less granular. For example, the proximity information can be detected touching, detected near field to a target object, or detected far field from a target object. In some examples, an intensity of the flip gesture 400 is also detected and used to differentiate different flip gestures 400. For example, the intensity of the flip gesture 400 can be based on acceleration, speed, or angular velocity or angular acceleration.

In some examples, the mobile device 102 performs one or more actions in response to detecting the flip gesture 400. As one example, the mobile device 102 adds media to a collection associated with the target object in response to detecting the flip gesture 400. As another example, two users may be splitting a tab. A first user may use the flip gesture 400 onto the phone of another user, which includes a code on its screen. The mobile device 102 of the first user then adds a selected amount of funds to an account of the second user in response to detecting the flip gesture 400.

The block diagram of FIG. 4 is not intended to indicate that the example flip gesture 400 is to include all of the components shown in FIG. 4. Further, the flip gesture 400 may include any number of additional components not shown in FIG. 4, depending on the details of the specific implementation. For example, the flip gesture 400 may be based on additional motions, relative position vectors, or distances, and may cause the mobile device 102 to perform other types of actions. In addition, the flip gesture 400 can be flipped onto additional target objects to perform additional actions.

Figure 5:
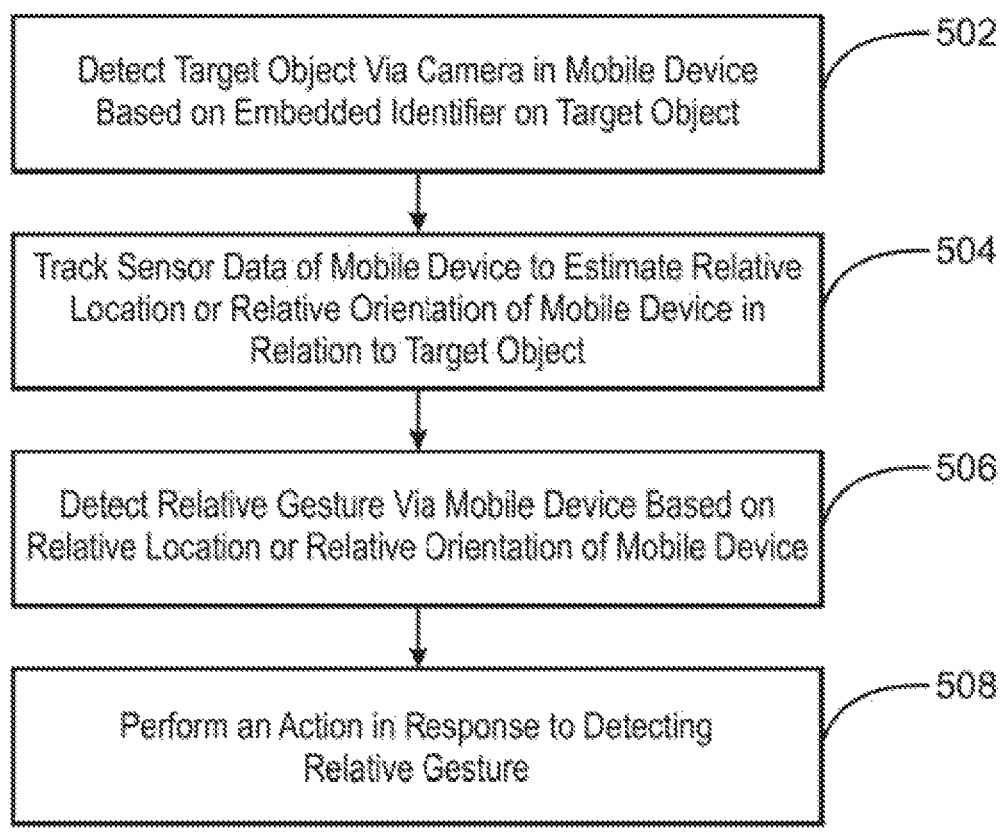
FIG. 5 is a process flow diagram illustrating an example method for performing actions in response to detecting relative gestures.

FIG. 5 is a process flow diagram illustrating an example method for performing actions in response to detecting relative gestures. The method 500 of FIG. 5 can be implemented using any of the relative gestures of FIGS. 1-4 or in the computing device 602 or machine-readable storage medium 700 of FIG. 7. For example, the method may be implemented using processor 604.

At block 502, a target object is detected via a camera in a mobile device based on an embedded identifier on the target object. In some examples, the target object is a photo or a three-dimensional object. The embedded identifier may be a barcode or a number of dots used to embed data into the target object. For example, the data can include a uniform resource locator (URL) or any other data. As one example, a model of an Eifel tower may be associated with media related to vacations. In another example, an album cover may be associated with media related to a band or a music genre. In the case that the target object is a three dimensional object, the embedded identifier may be embedded into the texture of the object or the shape of the object. As one example, a three dimensional printed object can have an embedded identifier printed into the texture of the surface of the object.

At block 504, sensor data of the mobile device is tracked to estimate a relative location or a relative orientation of the mobile device in relation to the target object. In some examples, the sensor data includes accelerometer data, gyroscopic data, compass data, camera data, or any combination thereof. In some examples, an initial relative location of the target object can be determined based on the size and shape of the embedded identifier.

At block 506, a relative gesture is detected via the mobile device based on the relative location or the relative orientation of the mobile device. In some examples, detecting the relative gesture includes detecting a shake of the mobile device in the direction of the target object. In some examples, detecting the relative gesture includes detecting a flip of the mobile device displaying the media onto the target object. In some examples, detecting the relative gesture comprises detecting a pulling motion at the mobile device from a position within a threshold range of the target object. In some examples, detecting the relative gesture includes detecting a swipe across a touch screen of the mobile device in the direction of the target object.

At block 508, an action is performed in response to detecting the relative gesture. In some examples, media is manipulated with respect to the target object based on the detected relative gesture. For example, manipulating the media may include associating the media with the embedded identifier. As one example, media such as a photo or a video can be captured or selected via the mobile device and associated with the target object. In some examples, manipulating the media includes disassociating the media with the embedded identifier. In another example, one or more previously associated media may be disassociated from the target object. In some examples, manipulating the media includes automatically playing back the media, the media associated with the embedded identifier. As one example, an audio track associated with a target object can be played back automatically in response to detecting a particular relative gesture. In some examples, manipulating the media includes automatically pulling media associated with the embedded identifier from a server. For example, the media may be downloaded onto the mobile device from a web server or a cloud server. In some examples, audio, visual, tactile or haptic feedback is provided in response to detecting the relative gesture. For example, a particular sound, image, or vibration may be associated with each type of relative gesture. In addition, the feedback may also differ based on an intensity of the gesture. For example, a detected pull gesture with greater amount of pull may have a different sound, image, or vibration than a detected pull gesture with a lesser amount of pull. As another example, multiple relative gestures are combined. For example, if there is a photo of a scene, and a photo of a family member, then a user can first use a pull gesture relative to the scene photo to grab a copy of that photo and then use a push gesture relative to the photo of the family member to send him or her a copy of the scene picture.

It is to be understood that the process diagram of FIG. 5 is not intended to indicate that all of the elements of the method 500 are to be included in every case. Further, any number of additional elements not shown in FIG. 5 may be included in the method 500, depending on the details of the specific implementation. For example, the method may include receiving one or more media associated with the target object based on the target object. In some examples, the target object is associated with a source of or a destination for the media. For example, the mobile device may receive media from a particular user of an application in response to detecting the relative gesture or send media to a particular user of the application in response to detecting the relative gesture. In some examples, other actions may be performed in response to detecting the relative gesture. For example, the other actions may include calling or sending a text message or email to a destination associated with the target object. As one example, a phone call is placed to a user associated with a picture of the user in response to detecting a relative gesture towards the picture of the user. In some examples, other possible types of relative gestures may also be used. For example, the relative gesture may be any other gesture that is based on a relative position between a mobile device and a target object. As one example, a relative gesture is a phone gesture, wherein a mobile device is held upright and perpendicular to the target object such that a user would be holding the phone to an ear while facing the target object.

Figure 6:
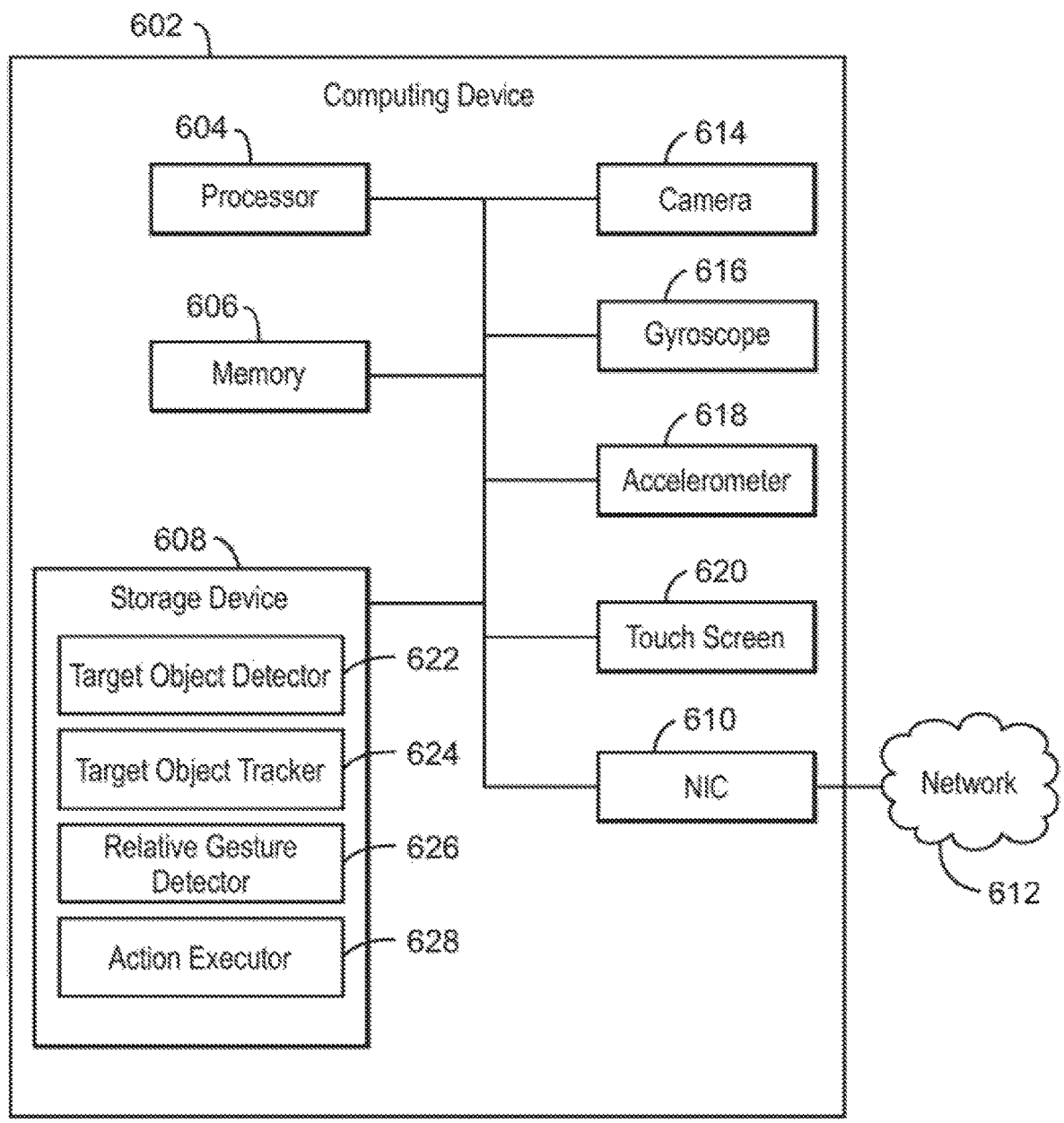
FIG. 6 is block diagram of an example computing device to detect relative gestures and perform actions in response to detecting the relative gestures.

FIG. 6 is a block diagram of an example computing device 602 to detect relative gestures and perform actions in response to detecting the relative gestures. For example, the computing device 602 may be a mobile device, such as a smartphone, a tablet, or a laptop. The computing device 602 may include a processor 604, memory 606, a machine-readable storage 608, and a network interface 610 to connect computing system 602 to network 612. For example, the network interface 610 can be a network interface card (NIC).

In some examples, the processor 604 may be a main processor that is adapted to execute the stored instructions. Moreover, more than one processor 604 may be employed. Further, the processor 604 may be a single core processor, a multi-core processor, a computing cluster, or any number of other configurations. The processor 604 may be implemented as Complex Instruction Set Computer (CISC) or Reduced Instruction Set Computer (RISC) processors, x86 Instruction set compatible processors, ARMv7 Instruction set compatible processors, multi-core, or any other microprocessor or central processing unit (CPU).

The memory 606 may be one or more memory devices. The memory 606 may be volatile memory or nonvolatile memory. In some examples, the memory 606 may include random access memory (RAM), cache, read only memory (ROM), flash memory, and other memory systems.

The storage 608 is machine-readable storage and may include volatile and nonvolatile memory. In some examples, the machine-readable storage 608 may be electronic, magnetic, optical, or other physical storage device that stores executable instructions (e.g., code, logic). Thus, the machine-readable storage 608 may be, for example, RAM, an Electrically-Erasable Programmable Read-Only Memory (EEPROM), a storage drive such as a hard drive or solid state drive (SSD), an optical disc, and the like. The storage 608 may also include storage or memory external to the computing device 602. Moreover, as described herein, the machine-readable storage 608 may be encoded with executable instructions (e.g., executed by the one or more processors 604) for prioritizing data. For example, the machine-readable storage 608 may be encoded with executable instructions for detecting relative gestures and manipulating media based on the detected relative gestures.

In some examples, a network interface 610 (e.g., a network interface card or NIC) may couple the computing system 602 to a network 612. For example, the network interface 610 may connect computing system 602 to a local network 612, a virtual private network (VPN), or the Internet. In some examples, the network interface 610 may include an Ethernet controller.

The computing device 602 may also include a camera 614, a gyroscope 616, an accelerometer 618, and a touch screen 620. In some examples, the camera 614 is a color (RGB) camera. In some examples, the camera 614 is an infrared camera. The gyroscope 616 and accelerometer 616 can detect movement of the computing device 602. For example, the gyroscope 616 can measure orientation and angular velocity of the computer device 602. The accelerometer 618 can measure proper acceleration, which is the acceleration of the computing device in its own instantaneous rest frame. The touch screen 620 can include a display device and a touch input device. For example, the touch screen 620 may detect simple or multi-touch gestures in response to detected touching of the touch screen 620 with a stylus or one or more fingers.

The storage 608 may include a target object detector 622, a target object tracker 624, a relative gesture detector 626 and an action executor 628. The target object detector 622, a target object tracker 624, a relative gesture detector 626, and an action executor 628 may be instructions (e.g., code, logic, etc.) store in the machine-readable storage 608 and executed by the processor 604 or other processor to direct the computing device 602 to implement the aforementioned actions. An application-specific integrated circuit (ASIC) may also be employed. In other words, one or more ASICs may be customized for the aforementioned actions implemented via the target object detector 622, a target object tracker 624, a relative gesture detector 626 and an action executor 628.

The target object detector 622 can detect a target object via a camera in a mobile device based on an embedded identifier on the target object. For example, the embedded identifier may be a barcode or a pattern of dots encoding data. The target object tracker 624 can track sensor data of the mobile device to estimate a relative location or a relative orientation of the mobile device in relation to the target object. The relative gesture detector 626 can detect a relative gesture via the mobile device based on the relative location or the relative orientation of the mobile device. For example, the relative gesture may be a touch and swipe gesture in the direction of the target object. In some examples, the relative gesture is a shake of the mobile device in the direction of the target object. In some examples, the relative gesture is a flip gesture onto the target object. In some examples, the relative gesture is a pull gesture at the mobile device from within a threshold distance of the target object. The action executor 628 can download, upload, or transfer a file associated with the target object in response to detecting the detected relative gesture. In some examples, the action executor 628 associates or disassociates the media with the target object. In some examples, the action executor 628 retrieves the media associated with the target object. For example, the media can be retrieved from a website or cloud service, or any other data source.

The block diagram of FIG. 6 is not intended to indicate that the computing device 602 is to include all of the components shown in FIG. 6. For example, the computing device 602 may not include one or more of the gyroscope 616, the accelerometer 618, or the touch screen 620. Further, the computing device 602 may include any number of additional components not shown in FIG. 6, depending on the details of the specific implementation. For example, the computing device 602 may include a simple display that does not include any touch input component.

Figure 7:
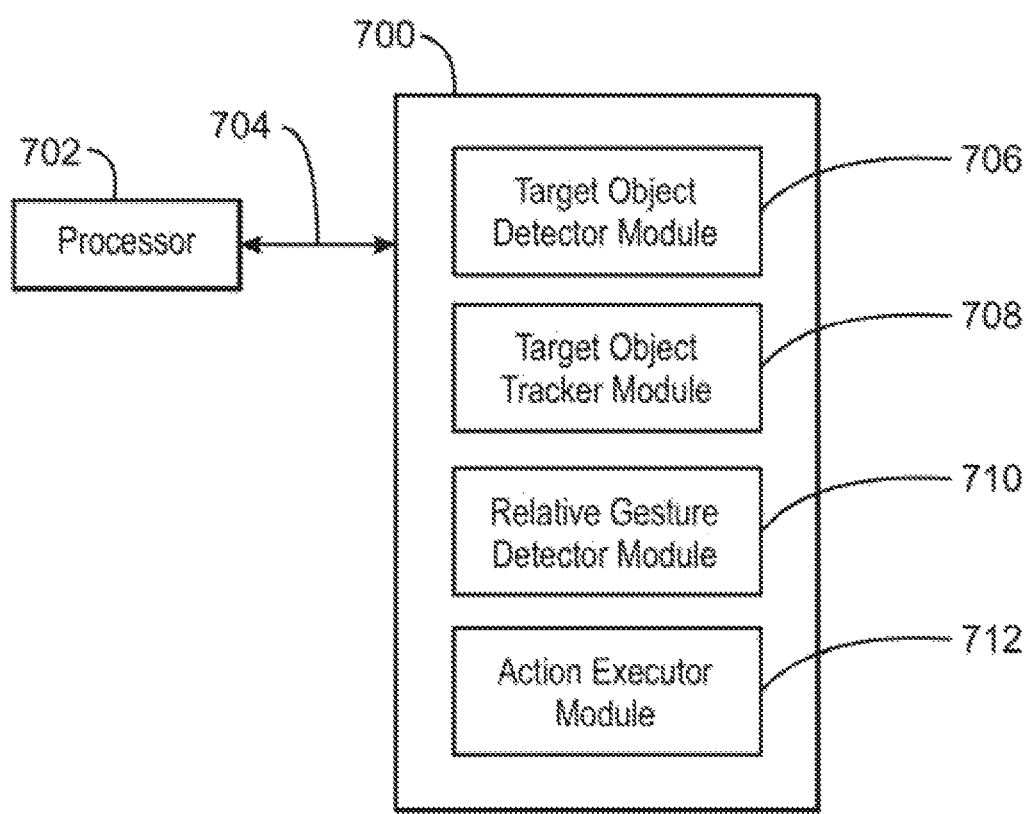
FIG. 7 is a drawing of an example machine-readable storage medium that can be used to detect relative gestures and perform actions in response to detecting the relative gestures.

FIG. 7 is a block diagram showing a tangible, non-transitory, machine-readable storage medium 700 that stores code to direct a processor to detect relative gestures and perform actions in response to detecting the relative gestures. The machine-readable storage medium 700 can include RAM, a hard disk drive, an array of hard disk drives, an optical drive, an array of optical drives, a non-volatile memory, a flash drive, a digital versatile disk (DVD), or a compact disk (CD), among others. The machine-readable storage medium 700 may be accessed by a processor 702 over a bus 704. The processor 702 may be a processor of a computing device, such as the processor 604 of FIG. 6. In some examples, the processor 702 may be a field-programmable gate array (FPGA) processor and/or an ASIC processor. Furthermore, as indicated, the machine-readable storage medium 700 may include code configured to perform the methods and techniques described herein. Indeed, the various logic components discussed herein may be stored on the machine-readable storage medium 700. Portions 706, 708, 710, 712 of the machine-readable storage medium 700 can include target object detector code, target object tracker code, relative gesture detector code, and action executor code, respectively, which may be executable code (machine readable instructions) that direct a processor or controller in performing the techniques discussed with respect to the preceding figures.

Indeed, the various logic (e.g., instructions, code) components discussed herein may be stored on the tangible, non-transitory machine-readable storage medium 700 as indicated in FIG. 7. For example, the machine-readable storage medium 700 may include the target object detector module 706 that, when executed by a processor, direct the processor or a computing device to detect a target object via a camera in a mobile device based on an embedded identifier on the target object. For example, the embedded identifier can be a barcode, such as a UPC or a QR code. In some examples, the embedded identifier is a number of dots arranged to embed data into a photo or object. The machine-readable storage medium 700 may also include target object tracker module 708 that when executed by a processor to direct the processor or a computing device to track sensor data of the mobile device to estimate a relative location or a relative orientation of the mobile device in relation to the target object. For example, the sensor data may include accelerometer data or gyroscope data. Further, the target object tracker module 708 can direct the processor or computing device to determine an initial relative position of the mobile device with respect to the target object based on the embedded identifier. For example, the initial relative position may be based on the size or shape of the embedded identifier. The machine-readable storage medium 700 may further include relative gesture detector module 710 that, when executed by a processor, direct the processor or a computing device to detect a relative gesture via the mobile device based on the relative location or the relative orientation of the mobile device. For example, the relative gesture can be a swipe gesture, a shake gesture, a pull gesture, or a flip gesture, as described in greater detail in FIGS. 1-4 above. In some examples, a swipe gesture is detected based on a gesture vector matching a relative position vector. For example, the gesture vector for a swipe gesture may be generated based on touch screen data received at the mobile device. In some examples, a shake gesture is detected based on acceleration data and direction information. In some examples, a pull gesture is detected based on displacement information and direction information. For example, a pull gesture can be detected based on a displacement information and direction information. In some examples, a flip gesture may be detected based on gyroscope data and distance information. For example, the flip gesture may be detect in response to detecting a 180 degree turn and a proximity within a threshold distance from the target object. The machine-readable storage medium 700 may further include action executor module 712 that, when executed by a processor, direct the processor or a computing device to associate or disassociate a file with the target object in response to detecting the relative gesture. In some examples, the action executor module 712 may direct the processor or a computing device to automatically play back media associated with the embedded identifier in response to detecting the relative gesture. In some examples, the action executor module 712 may direct the processor or a computing device to transfer a file associated with the embedded identifier in response to detecting the relative gesture.

Although shown as contiguous blocks, the logic components may be stored in any order or configuration. For example, if the machine-readable storage medium 700 is a hard drive, the logic components may be stored in non-contiguous, or even overlapping, sectors.

While the present techniques may be susceptible to various modifications and alternative forms, the examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method, comprising:
   detecting a target object via a camera in a mobile device based on an embedded identifier on the target object;
   tracking sensor data of the mobile device to estimate a relative location or a relative orientation of the mobile device in relation to the target object;
   detecting a relative gesture via the mobile device based on the relative location or the relative orientation of the mobile device; and
   performing an action in response to detecting the relative gesture;
   wherein detecting the relative gesture comprises detecting a shake of the mobile device in a direction of the target object.

2. The method of claim 1, comprising performing audio, visual, tactile or haptic feedback in response to detecting the relative gesture.

3. The method of claim 1, wherein performing an action comprises associating or disassociating additional media with the target object having the embedded identifier.

4. The method of claim 1, wherein performing an action comprises automatically playing back media, the media associated with the target object having the embedded identifier.

5. The method of claim 1, further comprising:
   distinguishing between a low-intensity version and a high-intensity version of the gesture, wherein performing an action comprises performing a different action in response to the low-intensity version of the gesture than in response to the high-intensity version of the gesture.

6. The method of claim 1, wherein detecting the relative gesture comprises detecting a flip of the mobile device displaying the media onto the target object.

7. The method of claim 1, wherein detecting the relative gesture comprises detecting a pulling motion at the mobile device from a position within a threshold range of the target object.

8. The method of claim 1, wherein the target object is an image comprising the embedded identifier, the method further comprising:
   with the mobile device, identifying media to be associated with the target object; and
   in response to a gesture performed by moving the mobile device relative to the target object, associating the identified media with the target object.

9. The method of claim 1, wherein the embedded identifier is a group of printed dots formed on the target object.

10. The method of claim 1, wherein the gesture comprises a movement across a touch screen of the mobile device in a direction toward the target object, the method comprising tracking relative location of the mobile device with respect to the target object.

11. The method of claim 1, further comprising downloading media to the mobile device in response to a pulling gesture of the mobile device being moved away from the target object, the media for download being associated with the target object.

12. The method of claim 11, further comprising:
    distinguishing between a lighter-intensity pull gesture and a heavier-intensity pull gesture; and
    downloading first media in response to the lighter-intensity pull gesture or downloading different, second media in response to the heavier-intensity pull gesture.

13. An apparatus, comprising a processor to:
    detect a target object via a camera in a mobile device based on an embedded identifier on the target object;
    track sensor data of the mobile device to estimate a relative location or a relative orientation of the mobile device in relation to the target object;
    detect a relative gesture via the mobile device based on the relative location or the relative orientation of the mobile device; and
    download, upload, or transfer a file associated with the target object in response to detecting the relative gesture;
    wherein the relative gesture comprises a shake of the mobile device in a direction of the target object.

14. The apparatus of claim 13, the processor further to, based on tracking relative location or orientation of the mobile device relative to the target object, detect the relative gesture comprising a touch and swipe gesture on a touchscreen of the mobile device, where the swipe is in a direction of the target object.

15. The apparatus of claim 13, wherein the relative gesture comprises a flip gesture onto the target object.

16. The apparatus of claim 13, wherein the relative gesture comprises a pull gesture at the mobile device from within a threshold distance of the target object.

17. A non-transitory machine-readable storage medium encoded with instructions executable by a processor, the non-transitory machine-readable storage medium comprising instructions to:
- detect a target object via a camera in a mobile device and based on an embedded identifier on the target object;
- track sensor data of the mobile device to estimate a relative location or a relative orientation of the target object in relation to the mobile device;
- detect a relative gesture via the mobile device based on the relative location or the relative orientation of the mobile device; and
- associate or disassociate a file with the target object in response to detecting the detected relative gesture;
- wherein detecting the relative gesture comprises detecting a shake of the mobile device in a direction of the target object.

18. The machine-readable storage medium of claim 17, comprising instructions to automatically play back media associated with the embedded identifier in response to detecting the relative gesture.

* * * * *